(12) United States Patent
Varma et al.

(10) Patent No.: US 9,557,804 B2
(45) Date of Patent: *Jan. 31, 2017

(54) DYNAMIC POWER LIMIT SHARING IN A PLATFORM

(71) Applicant: Intel Corporation, Santa Clara, CA (US)

(72) Inventors: Ankush Varma, Hillsboro, OR (US); Krishnakanth V. Sistla, Beaverton, OR (US); Cesar A. Quiroz, Santa Clara, CA (US); Vivek Garg, Folsom, CA (US); Martin T. Rowland, Beaverton, OR (US); Inder M. Sodhi, Folsom, CA (US); James S. Burns, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/867,490

(22) Filed: Sep. 28, 2015

(65) Prior Publication Data
US 2016/0018883 A1 Jan. 21, 2016

Related U.S. Application Data

(63) Continuation of application No. 13/976,687, filed as application No. PCT/US2012/031249 on Mar. 29, 2012, now Pat. No. 9,158,351.

(51) Int. Cl.
*G06F 1/32* (2006.01)
*G06F 1/26* (2006.01)

(52) U.S. Cl.
CPC .............. *G06F 1/3287* (2013.01); *G06F 1/26* (2013.01); *G06F 1/324* (2013.01); *G06F 1/3275* (2013.01);
(Continued)

(58) Field of Classification Search
CPC .... G06F 1/3287; G06F 1/3275; G06F 1/3296; G06F 1/324; G06F 1/26
See application file for complete search history.

(56) References Cited

U.S. PATENT DOCUMENTS

| 7,337,339 B1 | 2/2008 | Choquette et al. |
| 7,421,598 B2 | 9/2008 | Brittain et al. |

(Continued)

FOREIGN PATENT DOCUMENTS

CN 101916209 12/2010

OTHER PUBLICATIONS

International Search Report and Written Opinion for PCT Patent Application No. PCT/US2012/031249 Mailed Nov. 23, 2012, 9 Pages.

(Continued)

*Primary Examiner* — Stefan Stoynov
(74) *Attorney, Agent, or Firm* — Trop, Pruner & Hu, P.C.

(57) ABSTRACT

A method and apparatus for dynamic power limit sharing among the modules in the platform. In one embodiment of the invention, the platform comprises a processor and memory modules. By expanding the power domain to include the processor and the memory modules, dynamic sharing of the power budget of the platform between the processor and the memory modules is enabled. For low-bandwidth workloads, the dynamic sharing of the power budget offers significant opportunity for the processor to increase its frequency by using the headroom in the memory power and vice versa. This enables higher peak performance for the same total platform power budget in one embodiment of the invention.

18 Claims, 2 Drawing Sheets

(52) U.S. Cl.
CPC .......... *G06F 1/3296* (2013.01); *Y02B 60/1217* (2013.01); *Y02B 60/1228* (2013.01); *Y02B 60/1285* (2013.01)

(56) References Cited

U.S. PATENT DOCUMENTS

| | | |
|---|---|---|
| 7,787,405 B2 | 8/2010 | Dettinger et al. |
| 8,135,970 B2 | 3/2012 | Gaskins et al. |
| 8,140,868 B2 | 3/2012 | Felter et al. |
| 8,793,512 B2 * | 7/2014 | Branover ................ G06F 1/206 327/512 |
| 8,826,051 B2 * | 9/2014 | Wakrat .................. G06F 1/3203 713/300 |
| 2006/0288241 A1 | 12/2006 | Felter et al. |
| 2007/0245161 A1 | 10/2007 | Shaw et al. |
| 2008/0301475 A1 | 12/2008 | Felter et al. |
| 2012/0017099 A1 | 1/2012 | David et al. |
| 2012/0023351 A1 | 1/2012 | Wakrat et al. |

OTHER PUBLICATIONS

International Preliminary Report on Patentability for PCT Patent Application No. PCT/US2012/031249 mailed Oct. 9, 2014, 6 Pages.
State Intellectual Property Office, People's Republic of China, First Office Action mailed May 5, 2016 in Chinese Patent Application No. 201280071991.1.

* cited by examiner

DYNAMIC POWER LIMIT SHARING IN A PLATFORM

This application is a continuation of U.S. patent application Ser. No. 13/976,687, filed Aug. 6, 2013, which is a §371 national stage of international application PCT/US2012/031249, which filed Mar. 29, 2012, the content of which is hereby incorporated by reference.

FIELD OF THE INVENTION

This disclosure pertains to a platform, as well as code to execute thereon, and in particular but not exclusively, to the dynamic power limit sharing among the modules in the platform.

BACKGROUND DESCRIPTION

Traditionally, the power limit to the central processing unit (CPU) has been provided by the platform. With the advent of integrated memory controllers, the CPU or processor controls the power consumption of the memory modules in the platform as well. In a micro-processor based platform, the power consumption of the memory modules in the platform can constitute a significant portion of the total power consumed by the platform.

In many platforms, the processor and the memory modules are treated as separate power domains when the total platform power budget is allocated. When the total platform budget such as platform rating is determined, each domain is set to a realistic maximum value, which is not the worst case scenario. As such, there is a processor power limit that is obeyed by the processor and a memory power limit that is obeyed by the memory modules.

When the memory modules and the processor each have a separate power budget or limit, it limits the performance of the platform or system for low-bandwidth workloads.

BRIEF DESCRIPTION OF THE DRAWINGS

The features and advantages of embodiments of the invention will become apparent from the following detailed description of the subject matter in which.

DETAILED DESCRIPTION

Figure 1:
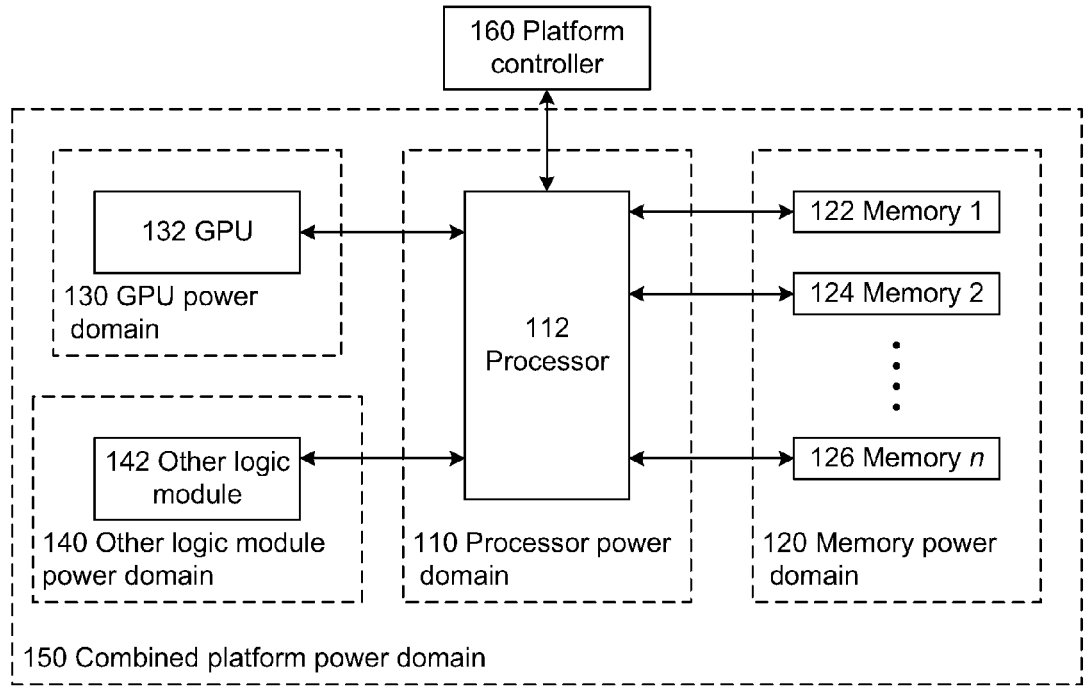
FIG. 1 illustrates the block diagram of a platform in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and apparatus for dynamic power limit sharing among the modules in the platform. The platform includes, but is not limited to, a desktop computer, a tablet computer, a laptop computer, a netbook, a notebook computer, a personal digital assistant (PDA), a tablet, a server, a workstation, a cellular telephone, a mobile computing device, a smart phone, an Internet appliance or any other type of computing device.

In one embodiment of the invention, the platform comprises a processor and memory modules. By expanding the power domain to include the processor and the memory modules, dynamic sharing of the power budget or limit of the platform between the processor and the memory modules is enabled. For low-bandwidth workloads, the dynamic sharing of the power budget offers significant opportunity for the processor to increase its frequency by using the headroom in the memory power and vice versa. This enables higher peak performance for the same total platform power budget in one embodiment of the invention.

In another embodiment of the invention, the platform comprises other logic modules and the platform enables dynamic sharing of the power limit among the logic modules. The logic module includes, but is not limited to, a processor, a co-processor, a digital signal processor, a graphics processing unit (GPU), a memory module and other module where the power consumption of the module can be estimated.

FIG. 1 100 illustrates the block diagram of a platform in accordance with one embodiment of the invention. In one embodiment of the invention, the platform comprises a processor 112, memory modules 1 122, 2 124, n 126, the GPU 132 and the other logic module 142. The memory module n 126 illustrates that the processor can be coupled with any number of memory modules and the other module 142 illustrates that the platform can have other logic modules coupled with the processor 112.

In one embodiment of the invention, each module in the platform has its own power domain. For example, in one embodiment of the invention, the processor 112 is powered by the processor power domain 110, the memory modules 1 122, 2 124, n 126 are powered by the memory power domain 120, the GPU 132 is powered by the GPU power domain 130 and the other logic module 142 is powered by the other logic power domain 140.

To enable dynamic sharing of the power limit among the modules in the platform, the platform creates a combined platform power domain 150 in one embodiment of the invention. The modules of the platform obey the power limit set in the combined platform power domain 150 but the individual constraints on each module can be relaxed in one embodiment of the invention. By doing so, it allows dynamic power sharing among the modules in the platform in one embodiment of the invention.

Further, with one limit for the combined platform power domain 150, only one guard band is needed to be added for the platform and it allows minimal guard band requirements for the power consumption of each of the modules in the platform in one embodiment of the invention. This is because the modules in the platform are dynamically sharing the power consumption limit for the combined platform power domain 150.

For example, when the processor is executing a low bandwidth task and the memory modules do not require high memory bandwidth utilization, the power limit of the processor is dynamically increased while the power limit of the memory modules are decreased such that the power budget of the combined platform power domain is still obeyed. This enables the processor to execute faster with a higher power limit while power of the memory modules is decreased.

In one embodiment of the invention, the combined platform power domain 150 allows the platform to handle a power sensitive environment where the overall power budget or limit needs to be maintained while allowing each of the modules to execute in an efficient way.

In one embodiment of the invention, the platform has a register to store the programmable limit for the combined platform power domain 150 and another register to set the programmable platform domain time window over which the limit is enforced. In one embodiment of the invention, the limit of the combined platform power domain 150 is created in addition to the existing limits of the modules in the platform. In another embodiment of the invention, the limit of the combined platform power domain 150 replaces the power limits of the modules in the platform.

In one embodiment of the invention, the platform has logic to enforce the limit for the combined platform power domain 150 by changing the power consumption of the modules in the platform. For example, in one embodiment of the invention, the platform executes logic such as processor-based firmware to enforce the limit of the combined platform power domain 150. The processor-based firmware dynamically changes the behavior of each module such that the module stays within the limit of the combined platform power domain 150.

For example, in one embodiment of the invention, in order to change the power consumption of the processor 112, the logic in the platform changes one or more parameters of the processor 112 that include, but are not limited to, voltage input, frequency, throughput of instructions, and any other parameter that affects the power consumption of the processor 112. In one embodiment of the invention, in order to lower the power consumption of the processor 112, the logic in the platform switches the executing code or instructions to a lower performing code that requires less power by only using lower precision arithmetic units, but requires more iteration to build the precision.

For example, in another embodiment of the invention, in order to change the power consumption of the memory modules 1 122, 2 124, n 126, the platform changes one or more parameters of the memory modules 1 122, 2 124, n 126 that include, but are not limited to, voltage input, frequency, number of read instructions, number of write instructions, bandwidth throttling and any other parameter that affects the power consumption of the memory modules 1 122, 2 124, n 126. One of ordinary skill in the relevant will readily appreciate how to use other techniques to alter the power consumption of the modules and these other techniques can be used without affecting the workings of the invention.

In one embodiment of the invention, the platform controller 160 sets the power limits for each domain and communicates them to the processor 112. In one embodiment of the invention, the platform controller 160 is a hardware device such as a Board Management Controller (BMC) or a Manageability Engine (ME) that is connected through a dedicated hardware interface. In another embodiment of the invention, the platform controller 160 is a software entity such as a Node Manager that is in charge of the platform power management. In yet another embodiment of the invention, the platform controller 160 is integrated with the processor 112.

In one embodiment of the invention, the platform has logic such as processor-based firmware (P-code) to observe the average power consumption of the modules in the platform over the platform domain time window. For example, in one embodiment of the invention, the platform analyzes or determines the average processor and memory power consumption over the platform domain time window and adjusts the power consumption of the processor 112 and the memory modules 1 122, 2 124, n 126 to enforce both the individual processor and memory power limits and/or the limit of the combined platform power domain 150.

When a module has multiple power consumption limits, the lowest available limit is enforced by the platform. For example, in one embodiment of the invention, if the average processor power consumption over the platform domain time window exceeds the processor power limit, the voltage/frequency of the processor 112 is reduced. Similarly, if the average memory power consumption exceeds the memory power limit, the memory controller in the processor can be set to throttle the memory.

In addition, if the average platform power consumption exceeds the limit of the combined platform power domain 150, the platform selects the most power consuming module to reduce its power consumption such that the limit of the combined platform power domain 150 is met. For example, the platform may select the processor 112 and reduces its voltage/frequency because it is a performance-efficient mechanism for reducing the power of the platform. If the processor 112 is set to the lower operating point that consumes the least power but the limit of the combined platform power domain 150 is not met, the platform selects another module to throttle its power consumption to meet the limit of the combined platform power domain 150. For example, the platform may select the GPU 132 for throttling if the limit of the combined platform power domain 150 is not met.

In one embodiment of the invention, the processor-based firmware has access to the power measurements of the modules in the platform. This allows the average power consumption of each module to be determined and checked against the set threshold. For example, in one embodiment of the invention, the platform may access readings taken from the associated digital voltage regulators for the modules. In another embodiment of invention, the platform may estimate the power consumed by each module by using performance counters. One of ordinary skill in the relevant art will readily appreciate how to use other techniques of determining the power consumption of each module in the platform and these other techniques can be used without affecting the workings of the invention.

Figure 2:
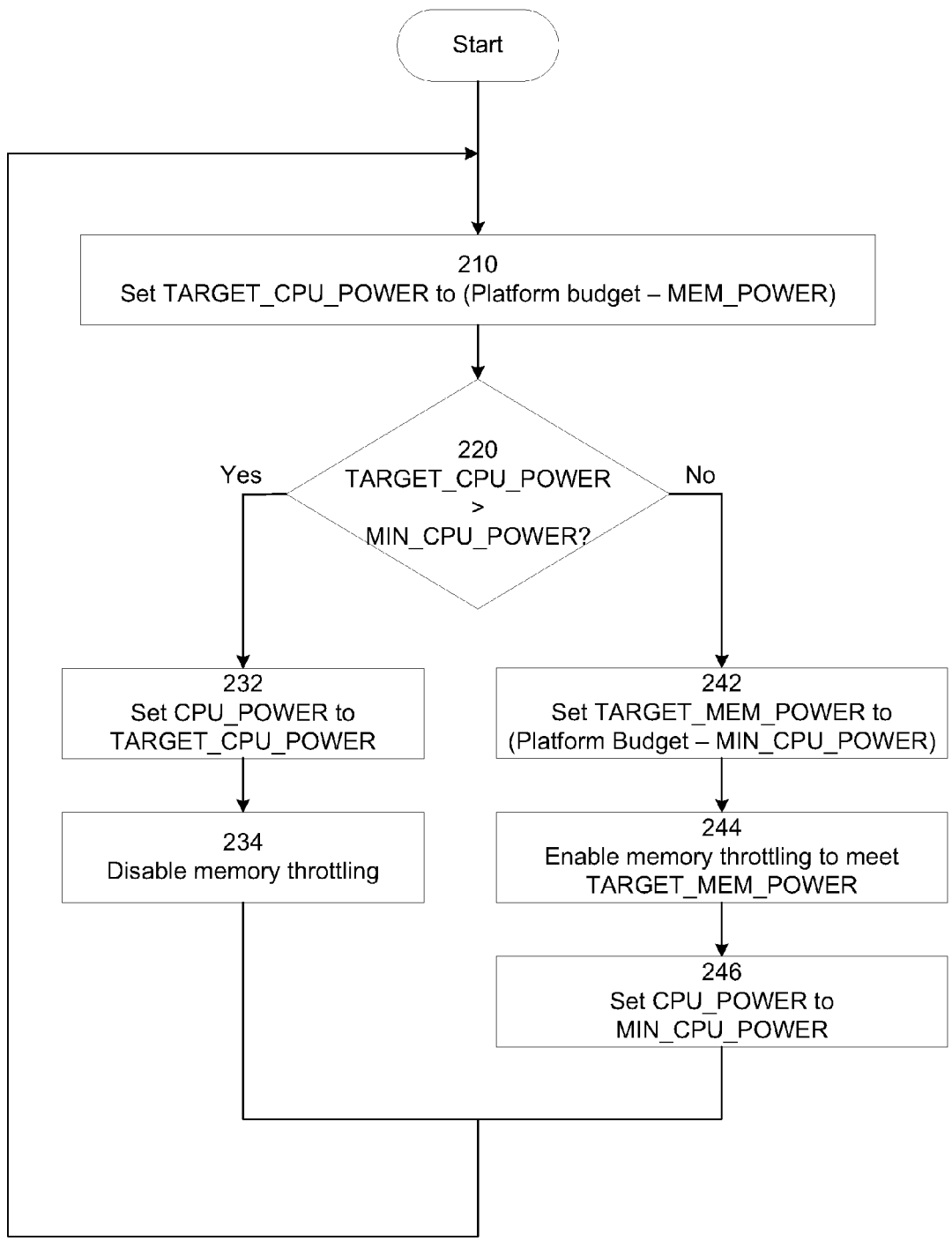
FIG. 2 illustrates the operations to enable dynamic power limit sharing in the platform in accordance with one embodiment of the invention.

FIG. 2 illustrates the operations to enable dynamic power limit sharing in the platform in accordance with one embodiment of the invention. For clarity of illustration, FIG. 2 is discussed with reference to FIG. 1. For ease of illustration, the operations illustrated in FIG. 2 apply to a platform with a processor power domain 110 and a memory power domain 120. One of ordinary skill in the relevant art will readily appreciate how to extend the operations for a platform with more modules and shall not be described herein.

In step 210, the target processor power (TARGET_CPU_power) is set to the difference between the combined platform power budget 105 (Platform budget) and the average memory power consumption (MEM_POWER). In one embodiment of the invention, the average memory power consumption is computed over the platform domain window time limit.

The step 210 allows the platform to dynamically share the power budget between the processor and the memory modules. For example, in one embodiment of the invention, when the average power consumption of the memory modules is low, a higher target processor power is given to the processor. Similarly, when the average power consumption of the memory modules is high, a lower target processor power is given to the processor.

In step 220, the operation 200 checks if the target processor power is greater than the minimum allowed processor power. The minimum allowed processor power is the lowest allowed power rating for the processor in one embodiment of the invention. If the target processor power is greater than the minimum allowed processor power in step 220, the processor power limit is set to the target processor power in step 232. In step 234, the operation 200 disable the throttling of the memory and the operation 200 goes back to step 210.

If the target processor power is not greater than or equal to the minimum allowed processor power in step 220, the target memory power limit (TARGET_MEM_POWER) is set to the difference between the combined platform power budget 105 and the minimum allowed processor power in step 242. In step 244, the operation 200 enables the throttling of the memory to meet the target memory power limit. In step 246, the operation 220 sets the processor power limit to the minimum allowed processor power and the operation 200 goes back to step 210.

Figure 3:
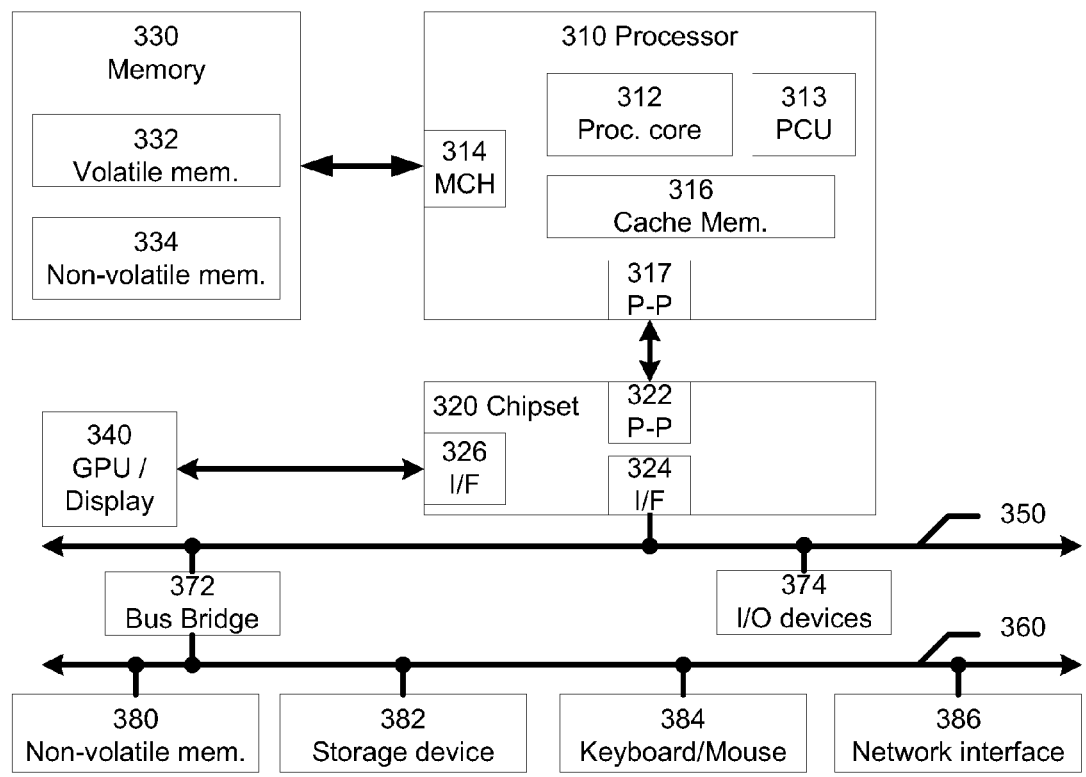
FIG. 3 illustrates a system to implement the methods disclosed herein in accordance with one embodiment of the invention.

FIG. 3 illustrates a system or platform 300 to implement the methods disclosed herein in accordance with one embodiment of the invention. The system 300 includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the system 300 used to implement the methods disclosed herein may be a system on a chip (SOC) system.

The processor 310 has a processing core 312 to execute instructions of the system 300. The processing core 312 includes, but is not limited to, fetch logic to fetch instructions, decode logic to decode the instructions, execution logic to execute instructions and the like. The processor 310 has a cache memory 316 to cache instructions and/or data of the system 300. In another embodiment of the invention, the cache memory 316 includes, but is not limited to, level one, level two and level three, cache memory or any other configuration of the cache memory within the processor 310.

The memory control hub (MCH) 314 performs functions that enable the processor 310 to access and communicate with a memory 330 that includes a volatile memory 332 and/or a non-volatile memory 334. The volatile memory 332 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 334 includes, but is not limited to, NAND flash memory, phase change memory (PCM), read only memory (ROM), electrically erasable programmable read only memory (EEPROM), or any other type of non-volatile memory device.

The memory 330 stores information and instructions to be executed by the processor 310. The memory 330 may also stores temporary variables or other intermediate information while the processor 310 is executing instructions. The chipset 320 connects with the processor 310 via Point-to-Point (PtP) interfaces 317 and 322. The chipset 320 enables the processor 310 to connect to other modules in the system 300. In another embodiment of the invention, the chipset 320 is a platform controller hub (PCH). In one embodiment of the invention, the interfaces 317 and 322 operate in accordance with a PtP communication protocol such as the Intel® QuickPath Interconnect (QPI) or the like. The chipset 320 connects to a GPU or a display device 340 that includes, but is not limited to, liquid crystal display (LCD), cathode ray tube (CRT) display, or any other form of visual display device. In another embodiment of the invention, the GPU 340 is not connected to the chipset 320 and is part of the processor 310 (not shown).

In addition, the chipset 320 connects to one or more buses 350 and 360 that interconnect the various modules 374, 380, 382, 384, and 386. Buses 350 and 360 may be interconnected together via a bus bridge 372 if there is a mismatch in bus speed or communication protocol. The chipset 320 couples with, but is not limited to, a non-volatile memory 380, a mass storage device(s) 382, a keyboard/mouse 384 and a network interface 386. The mass storage device 382 includes, but is not limited to, a solid state drive, a hard disk drive, an universal serial bus flash memory drive, or any other form of computer data storage medium. The network interface 386 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 3 are depicted as separate blocks within the system 300, the functions performed by some of these blocks may be integrated within a single semiconductor circuit or may be implemented using two or more separate integrated circuits. The system 300 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A processor comprising:
   a plurality of cores, wherein at least a first core of the plurality of cores comprises a fetch logic to fetch instructions, a decode logic to decode the instructions, and execution logic to execute the instructions;
   a cache memory; and
   logic to:
      set, for a platform comprising the processor and a memory module, a power limit for the processor and another power limit for the memory module based on a power budget for the platform, wherein the power limit for the processor is to be set as a difference of the power budget for the platform and the another power limit for the memory module and is to be set to at least a minimum allowed power consumption of the processor;
      analyze an average power consumption of the processor;
      analyze another average power consumption of the memory module; and
      adjust a power consumption of at least one of the processor and the memory module to enforce the power budget.

2. The processor of claim 1, wherein the logic is further to determine a time period to enforce the power budget for the platform, and to dynamically set the power limit for the processor and the another power limit for the memory module based on the power budget for the platform for a duration of the time period.

3. The processor of claim 2, further comprising a first storage to store the time period.

4. The processor of claim 3, further comprising a second storage to store the power budget for the platform.

5. The processor of claim 1, wherein the logic is to determine the power limit for the processor according to one or more of:
   a number of stall counts of the processor; and
   characteristics of workloads executed by the processor.

6. The processor of claim 1, wherein the logic is to determine the power limit for the memory module according to memory bandwidth utilization of the memory module.

7. The processor of claim 1, wherein the logic is to adjust the power consumption of the processor by adjustment of one or more of, a voltage, a frequency, instruction throughput, and a performance level of code, of the processor.

8. The processor of claim 1, wherein the logic is to adjust the power consumption of the memory module by adjustment of one or more of, read operations, write operations, and a voltage, of the memory module.

9. The processor of claim 1, wherein the processor further comprises a graphics processor.

10. The processor of claim 1, wherein the processor further comprises a power control unit.

11. The processor of claim 1, wherein the processor further comprises a memory controller.

12. A system comprising:
   a logic module; and
   a processor coupled with the logic module, to:
      set, for the system, a power limit for the processor and another power limit for the logic module based on a power budget for the system, wherein the power limit for the processor is to be set to at least a minimum allowed power consumption of the processor and as a difference of the power budget for the platform and the another power limit for the logic module;
      analyze an average power consumption of the processor;
      analyze another average power consumption of the logic module; and
      adjust a power consumption of at least one of the processor and the logic module to enforce the power budget.

13. The system of claim 12, wherein the processor is further to determine a time period to enforce the power budget for the system, and to dynamically set the power limit for the processor and the another power limit for the logic module based on the power budget for the system for a duration of the time period.

14. The system of claim 12, wherein the processor is to adjust the power consumption of the processor according to one or more of adjustment of a voltage, a frequency, instruction throughput, and a performance level of code, of the processor.

15. The system of claim 12, wherein the processor is to determine the power limit for the logic module according to bandwidth utilization of the logic module.

16. The system of claim 12, wherein the logic module comprises one of a memory module, a graphics processor unit (GPU), and a co-processor.

17. A non-transitory machine readable medium having stored thereon instructions, which if performed by a machine cause the machine to perform a method comprising:
   setting, for a platform comprising a processor and a memory module, a power limit for the processor and another power limit for the memory module based on a power budget for the platform, wherein the power limit for the processor is to be set to at least a minimum allowed power consumption of the processor and as a difference of the power budget for the platform and the another power limit for the memory module;
   analyzing an average power consumption of the processor;
   analyzing another average power consumption of the memory module; and
   adjusting a power consumption of at least one of the processor and the memory module to enforce the power budget.

18. The non-transitory machine readable medium of claim 17, wherein the method further comprises determining the power limit for the processor according to one or more of:
   a number of stall counts of the processor; and
   characteristics of workloads executed by the processor.

* * * * *